United States Patent [19]
Willcocks

[11] Patent Number: 5,131,056
[45] Date of Patent: Jul. 14, 1992

[54] ELECTRONIC AIRBRUSHING

[75] Inventor: Roger K. W. Willcocks, London, England

[73] Assignee: Crosfield Electronics Limited, England

[21] Appl. No.: 644,665

[22] Filed: Jan. 23, 1991

[30] Foreign Application Priority Data

Jan. 23, 1990 [GB] United Kingdom ............... 9001513

[51] Int. Cl.$^5$ .............................................. G06K 9/00
[52] U.S. Cl. ......................................... 382/54; 358/81
[58] Field of Search ............... 382/54, 55, 57; 358/22, 358/80, 81, 82; 340/701, 707, 709

[56] References Cited

U.S. PATENT DOCUMENTS

| | | | |
|---|---|---|---|
| 3,772,465 | 11/1973 | Vlahos et al. | 358/22 |
| 3,846,826 | 11/1974 | Mueller | 358/81 |
| 4,606,625 | 8/1986 | Geshwind | 358/81 |
| 4,767,731 | 11/1987 | Ghazey | 358/22 |
| 4,972,500 | 11/1990 | Ishii et al. | 382/54 |
| 5,014,333 | 5/1991 | Miller et al. | 382/54 |

*Primary Examiner*—Leo H. Boudreau
*Attorney, Agent, or Firm*—Sughrue, Mion, Zinn Macpeak & Seas

[57] ABSTRACT

A method of simulating airbrushing of an image electronically comprises generating a set of pixel values from a stored set. The pixels define the area of an airbrush and the color content is modified by selecting sets in sequence, then combining the image pixel content with the pixel value and a unit amount of brush color. The pixel values are generated by dividing the sequence into sets and recording the number of occurrences of each pixel coordinate in a set. The brush may be a single color or contain pixels of many different colors when defined by another image.

6 Claims, 2 Drawing Sheets

ELECTRONIC AIRBRUSHING

FIELD OF THE INVENTION

The invention relates to a method of simulating electronically the airbrushing of an image.

DESCRIPTION OF THE PRIOR ART

It is already known that conventional airbrushing can be simulated electronically using computer hardware and software. A major difficulty in electronic airbrushing is the need for rapid creation of a sufficiently random distribution for the "paint" such that the unwanted patterning that results from non-random distributions is reduced to an acceptable level. An image to be painted is divided into a large number of pixels each of which describes the colour of the image at that point as a set of numbers representing respective colour components. Typically these would be red, green, and blue components but other representations are possible. The distribution of the brush is described by dividing the brush into a large number of pixels. The value of each brush pixel describes numerically how much "paint" would land on that pixel if the airbrush were held stationary and sprayed for some basic or unit period of time.

To simulate the effect of a real airbrush being sprayed onto a real image, a random co-ordinate is repeatedly generated whose value is governed by the brush distribution. The corresponding image pixels at that co-ordinate and a numerical description of a "blob" of paint to be sprayed are combined mathematically.

Although this is acceptable in theory, in practice generating random co-ordinates with the required brush distribution is difficult to perform quickly enough to provide a true simulation of the effect of using a real airbrush. Using a simulated airbrush does not transfer paint as fast as a real airbrush. One solution is to use a faster computing machine but this tends to be expensive. Another solution is to transfer more paint onto the image each time a co-ordinate is generated. However, this results in a spray pattern which is more "blobby" than with a real airbrush.

GB-A-2207587 describes using a set of binary arrays to simulate an airbrush spray.

SUMMARY OF THE INVENTION

In accordance with the present invention, a method of simulating electronically the airbrushing of an image comprises generating respective sets of pixel values (V) from at least one stored set of pixel values, the pixels defining the area of airbrushing, and modifying the colour content of each image pixel corresponding to the accessed pixel by combining the image pixel content with V ×a unit amount of brush colour, wherein the sets of pixel values are chosen so as to simulate a random airbrush and wherein the sets of pixel values are generated by generating a sequence of N random pixel co-ordinates, dividing the N pixel co-ordinates into a number of sets of co-ordinates, and for each set of co-ordinates recording the number of occurrences of each pixel co-ordinate to constitute the values V.

We have appreciated that the main problem with conventional airbrushing is the slow speed of the random generator. To overcome this, we therefore propose generating in advance one or a number of sets of pixel values which can then be accessed very rapidly without the need for a random generator to be used again.

In one example, all the sets of pixel values are generated in advance.

In other examples an initial set may be stored and succeeding sets generated from the first.

Typically, each set of pixel values will have the same dimensions although this is not essential.

It should also be noted that although typically the unit brush colour will be a single colour, in some circumstances the brush colour could be defined by another image such that each pixel of the brush may contain a different colour, the distribution of colour in the brush being the same as the area of image by which the brush was defined.

BRIEF DESCRIPTION OF THE DRAWINGS

An example of a method according to the invention will now be described with reference to the accompanying drawing in which.

EMBODIMENT

Figures 1, 2:
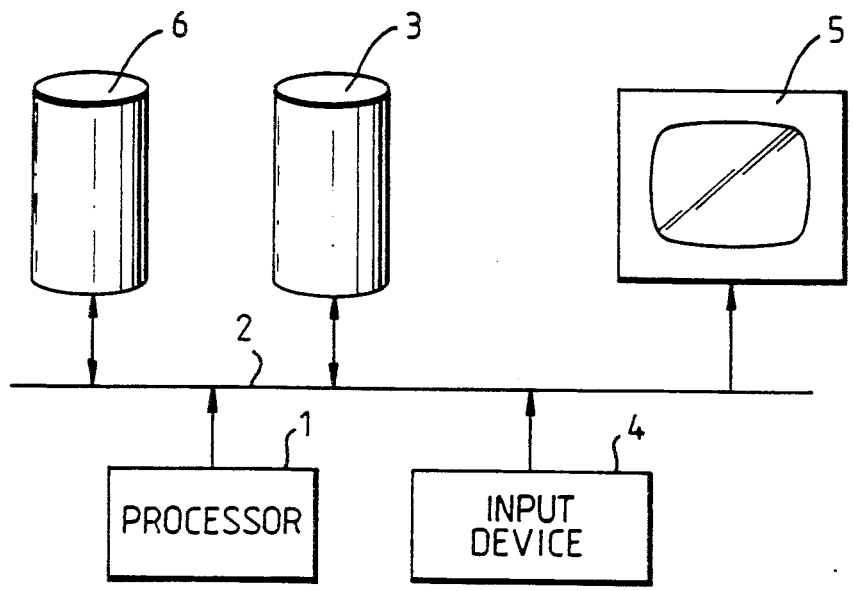
FIG. 1 is a schematic block diagram of apparatus for performing the method.
FIG. 2 illustrates generating a random sequence from an image.

The apparatus of FIG. 1 is similar to conventional apparatus for electronic airbrushing and comprises a processor 1 connected to a bus 2 to which is also connected an image store 3, an input device 4 (such as a digitizing table) and a monitor 5. Additionally, however, in contrast to the conventional apparatus, a further store 6 is provided connected to the bus 2 for storing brush data as described below.

In conventional electronic airbrushing the brush distribution may be defined by an array of e.g. 3 ×3 pixels (numbered 1–9) and the processor 1 causes a random number generator to generate values between 1 and 9 during the airbrush application. The operator uses the input device to move the centre of the brush distribution to the required part of the image which is displayed in a conventional manner on the monitor 5 and the processor 1 causes the appearance on the monitor 5 to change in accordance with the amount of paint which has been laid down during airbrushing.

For example, the random number generator may generate a set of N numbers as shown in Table 1 below.

TABLE 1

| N number sequence | 1 | 6 | 4 | 1 | 8 | 5 | 9 | 2 | 3 | 7 | 8 | 6 |
|---|---|---|---|---|---|---|---|---|---|---|---|---|
| | 4 | 2 | 8 | 1 | 9 | 5 | 3 | 7 | 6 | 9 | 2 | 8 |
| | 4 | 5 | 8 | 1 | | | | | | | | |

Thus, at the beginning of the airbrushing operation, the number generator generates a value 1 indicating that the region of the image corresponding to brush pixel number 1 (as determined from the location of the centre of the brush) is to be modified by adding a certain unit quantity of paint to the already existing pixel value in the image. The computer 1 thus modifies the colour content of the image pixel at the point in the store 3 at which the particular image pixel in question is stored, resulting in the image display being updated. This is then repeated for each of the pixels in the number sequence and then the sequence itself repeats. Of course, in this example, N is very small (28) and in practice will be much larger to avoid unwanted patterning.

To avoid the use of the number generator in real time we propose a system in which there are a minimum number (B) of co-ordinates at which paint will be transferred in a single operation of the airbrush. By making that amount reasonably small the behaviour of a real airbrush can be closely approximated.

The N co-ordinates produced by the random generator are divided into a number of sets each containing B co-ordinates. For example, consider the case where B=4. The sets of B co-ordinates will then be as shown in Table 2.

TABLE 2

| Set Number | Co-ordinates | | | |
|---|---|---|---|---|
| 1 | 1 | 6 | 4 | 1 |
| 2 | 8 | 5 | 9 | 2 |
| 3 | 3 | 7 | 8 | 6 |
| 4 | 4 | 2 | 8 | 1 |
| 5 | 9 | 5 | 3 | 7 |
| 6 | 6 | 9 | 2 | 8 |
| 7 | 4 | 5 | 8 | 1 |

For each of these N/B sets of co-ordinates a map is generated corresponding to the brush distribution with the content of the map at each pixel defining the number of occurrenes of that pixel within the set. This is illustrated in Table 3 below.

TABLE 3

| Brush Distribution | 1 | 2 | 3 |
|---|---|---|---|
| | 4 | 5 | 6 |
| | 7 | 8 | 9 |
| Set Number | Map | | |
| 1 | 2 | 0 | 0 |
| | 1 | 0 | 1 |
| | 0 | 0 | 0 |
| 2 | 0 | 1 | 0 |
| | 0 | 1 | 0 |
| | 0 | 1 | 1 |
| 3 | 0 | 0 | 1 |
| | 0 | 0 | 1 |
| | 1 | 1 | 0 |
| 4 | 1 | 1 | 0 |
| | 1 | 0 | 0 |
| | 0 | 1 | 0 |
| 5 | 0 | 0 | 1 |
| | 0 | 1 | 0 |
| | 1 | 0 | 1 |
| 6 | 0 | 1 | 0 |
| | 0 | 0 | 1 |
| | 0 | 1 | 1 |
| 7 | 1 | 0 | 0 |
| | 1 | 1 | 0 |
| | 0 | 1 | 0 |

Each of these sets is a brush distribution because it describes how much paint would land on a given pixel in the time it takes to spray B blobs or unit amounts of paint. Within each of these new brush distributions the value of a pixel is the number of blobs of paint that will be transferred to the corresponding image co-ordinate during the B-long sequence of the original N co-ordinates. Thus we can simply use the value of the pixel in the distribution to modulate the number of blobs to combine with the image pixels at the corresponding co-ordinates. In other words, if the map values are denoted by V then the final image pixel will be V × the unit paint value + the original image value. Of course, this may not be a straight addition but some more complex convolution.

The random number sequence described above could also be generated by scanning a picture of a spray pattern generated by a real airbrush, for example and creating an ordered sequence of coordinates, in which the number of duplications of a given coordinate is proportional to the amount of "paint" at that coordinate in the image.

FIG. 2 shows an example in which a part of an image has been scanned and digitised to produce an array of density distribution which is used to generate a random number sequence.

The numbers 7 on each box are the coordinates of the scanned part of the image and the FIGS. 8 within the boxes represent the number of unit amounts of paint applied at each coordinate. This can be rewritten as a sequence of coordinates 2223455556688. This sequence is then mixed up in some random scheme and divided into sets of B long sequences as described below.

We can create more "B" long sequences (and thus make the brushing sequence repeat less often) by replicating the ordered sequence some number of times before mixing it up.

This is an improvement over previous methods because the rate of application of paint at a given coordinate varies randomly between the various generated brush distributions, and this more accurately describes the random nature of the airbrush. Replicating the sequence provides finer detail and allows fractional paint values to be laid down.

By changing the value of "B" the visual effect of the brushing simulation is varied. If B=1, the effect is identical to the method in which the co-ordinates are generated on a per-blob basis. If B=N we have a brush distribution in which each pixel records the number of blobs of paint that will be transferred to the corresponding image co-ordinate during the entire N-long sequence of co-ordinates.

As B gets larger the minimum amount of paint that can be transferred gets larger. The simulation behaves less like a real airbrush. The simulation can be improved by changing the mathematical combination function by which the paint is combined with the image. One method is to divide each pixel value in the new brush distribution by the same amount. But this can suffer from quantisation errors. We are effectively dividing the values of each pixel in the brush distribution by some amount and then repeatedly using the result. The values thus generated are very sensitive to the accuracy the divided value was stored at. There are divided values, for instance ⅓, that cannot be accurately represented using conventional computer representations for fractional values.

A means of improving the accuracy is to use many slightly different sets of divided values which when summed give the original distribution using a method as described above.

Another method of generating these sets is to vary the likelihood of a fractional value being rounded down or up to the next integer value in each distribution according to its closeness to that integer value. So for instance if we wanted three new distributions (so B =N/3) we would use:

(P is a pixel value in the original N-blob brush distribution, first, second and third are the values of the corresponding pixels in the generated distributions)

first = rounddown (P/3)
second = rounddown ((P+1)/3)
third = rounddown ((P+2)/3)

Here (first + second + third) yields P as required.

Figure 3:
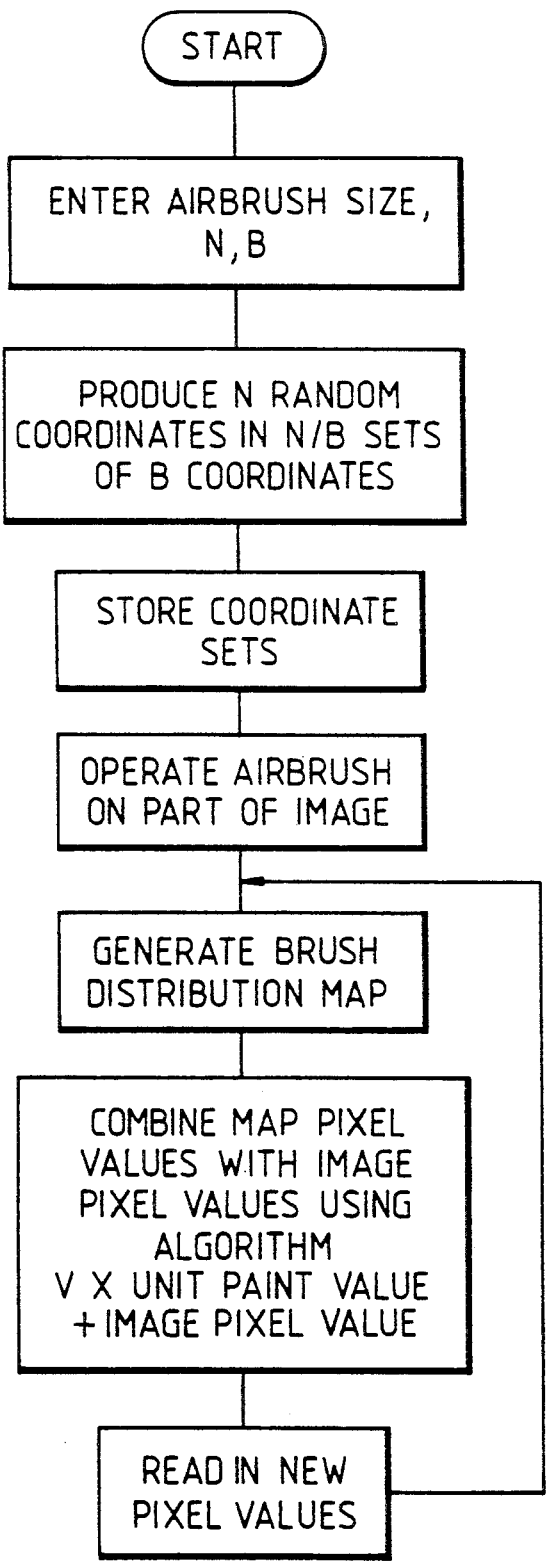
FIG. 3 is a flow chart showing the decision process according to the inventive method.

FIG. 3 is a flow chart showing the sequence of operation just described.

Note that it is not necessary to store the distributions containing first, second third etc. as they are easily regenerated from the original N-blob brush distribution, using for instance look-up-tables. So for example in the case described in which $N=28$, $B=4$ the seven required final patterns could be generated by passing the original distribution through seven different look-up tables each of which maps the original data to (nominally) one seventh of its value. The tables should be adjusted so that any rounding to integer values cancels out across all of the look-up tables, so that summing the (seven) final distributions will yield the original distribution.

As long as this condition holds the seven tables may be generated in any fashion.

I claim:

1. A method of simulating electronically the airbrushing of an image, the method comprising generating respective sets of airbrush pixel values (V) from at least one stored set of airbrush pixel values, the airbrush pixels defining the area of an airbrush, and modifying the colour content of each image pixel coinciding with an airbrush pixel by selecting the sets of airbrush pixel values in sequence; and for each set of airbrush pixel values combining the image pixel content with $V \times a$ unit amount of brush colour, wherein the sets of airbrush pixel values are generated by generating a sequence of N random pixel co-ordinates, dividing the N random pixel co-ordinates into a number of sets of co-ordinates, and for each set of co-ordinates recording the number of occurrences of each random pixel co-ordinate to constitute the values V.

2. A method according to claim 1, wherein the sets of airbrush pixel values are generated from a fraction of an original image.

3. A method according to claim 1, wherein all the sets of airbrush pixel values are generated in advance.

4. A method according to claim 1, wherein succeeding sets of airbrush pixel values are generated from a single stored set.

5. A method according to claim 1 wherein the generated pixel value P is recalculated from a sum of the pixel value plus an increment a, in the range from $0-(n-1)$, divided by the length of the sequence.

6. A method according to claim 1 wherein all sets produced from the sequence of N random pixel coordinates contain the same number of coordinates.

* * * * *